United States Patent [19]

Brown

[11] 3,821,697

[45] June 28, 1974

[54] VISUAL LANDING AND SURFACE GUIDANCE APPARATUS

[75] Inventor: Albert D. Brown, Atlanta, Ga.

[73] Assignee: Highway Traffic and Safety Corporation, Atlanta, Ga.

[22] Filed: Aug. 31, 1972

[21] Appl. No.: 285,438

[52] U.S. Cl.................................. 340/26, 340/25
[51] Int. Cl....................................... G08g 5/00
[58] Field of Search............ 340/22, 25, 26, 34, 32, 340/33

[56] References Cited
UNITED STATES PATENTS

| | | | |
|---|---|---|---|
| 2,597,321 | 5/1952 | Hergenrother | 340/26 |
| 3,138,779 | 6/1964 | Murray, Jr. et al. | 340/26 |
| 3,372,970 | 3/1968 | Winkle | 350/100 |
| 3,447,129 | 5/1969 | Birmingham et al. | 340/26 |
| 3,457,545 | 7/1969 | Brown | 340/25 |
| 3,533,062 | 10/1970 | Coffman | 340/40 |
| 3,599,143 | 8/1971 | Brown et al. | 340/26 |
| 3,639,899 | 2/1972 | Ljungkill | 340/25 |
| 3,662,332 | 5/1972 | Zechnowitz et al. | 340/26 |
| 3,674,226 | 7/1972 | Wasson | 340/26 |
| 3,690,599 | 9/1972 | Hager | 340/26 |

Primary Examiner—Kathleen H. Claffy
Assistant Examiner—Randall P. Myers
Attorney, Agent, or Firm—Jones, Thomas & Askew

[57] ABSTRACT

Apparatus for providing one or more beams of distinctive illumination capable of providing visual guidance information to the operator of a vehicle such as an aircraft, a marine vehicle, an automotive vehicle, or the like, as well as pedestrian guidance and control. The disclosed embodiments of the present invention project at least two visual guidance beams of contrasting colors, and the projection apparatus includes a color filter assembly which is selectively positionable to cause the guidance beams to be selectively projected in any of a plurality of planes, so that the same apparatus is useful for a variety of applications such as aircraft glide slope beam projection, wherein the beams of illumination are projected in a vertical array, and for surface guidance, wherein the beams are typically projected in a horizontal array. A disclosed embodiment of the present invention provides visual information enabling an operator of a vehicle to position the vehicle precisely at a predetermined stopping or turning location.

13 Claims, 6 Drawing Figures

PATENTED JUN 28 1974 3,821,697
SHEET 2 OF 2

VISUAL LANDING AND SURFACE GUIDANCE APPARATUS

This invention relates in general to visual guidance apparatus and in particular to guidance beam projection apparatus capable of use in a number of diverse applications and environments.

Many diverse situations arise in the operation of vehicles where it is desired to provide an apparatus or a system for delineating a desired path of vehicular motion and for advising the operator when his vehicle deviates from that path. With respect to aircraft, for example, it is frequently desirable to provide suitable apparatus which defines a desired glide slope to assist the pilot in landing the aircraft, especially in darkness or conditions of adverse illumination. There is also need for surface guidance apparatus which defines a desired path of travel across a surface, such as a marine channel, a signal-controlled vehicle or pedestrian traffic lane, or an airport taxi area, which may not be readily capable of being physically marked with lane lines or which may require additional guidance information.

Although numerous electronic navigation aids have been proposed and developed to overcome the foregoing problems, such as the use of ILS to provide glide slope information for landing aircraft, and the use of buried-wire surface guidance systems or conventional radar systems for surface navigation, the very substantial expense of the typical electronic navigation system is affordable only for the largest of airports and only for commercial airplanes, boats, and the like.

It has been proposed to project visually-distinguishable contiguous beams of illumination to define a desired glide slope for an aircraft. In U.S. Pat. No. 2,498,294, for example, a light projector is disclosed which projects contiguous red, green, and amber beams of illumination layered in a vertical array, with the red beam lowermost, the green beam intermediate, and the amber beam uppermost. The light projector of that patent is disposed in alignment with an aircraft landing path and is angularly aligned so that the green beam defines a desired glide slope angle. Apparatus of the type described in the foregoing patent is not known to have achieved substantial acceptance and use, however, possibly because such apparatus limited only to the described use would be substantially expensive to manufacture.

It has also been suggested in the art to use visual guidance apparatus for providing navigational information useful for surface vehicles. U.S. Pat. No. 3,599,143, for example, discloses apparatus which provides a plurality of contiguous, optically distinguishable beams of illumination disposed in a horizontal array to impart information corresponding to a desired path of travel and to lateral deviations therefrom. An optical beam projected by the apparatus of the last-mentioned patent also provides longitudinal guidance information by a technique which is dependent upon the distance between a selected horizontal plane, such as the path of vehicular travel, and the eyes of the vehicle operator. Since that distance depends upon a number of variables which are difficult to control, such as the elevation of the operator above the horizontal plane, the longitudinal guidance information imparted by the apparatus of the last-mentioned patent has not met with substantial acceptance in the art.

Whatever the relative merits and demerits of the prior-art visual guidance apparatus, such apparatus has been characterized by being designed for use in applications which tends to be relatively limited in number, and so such apparatus has suffered from high cost and other problems tending to minimize acceptance. It is proposed by the present invention to provide optical guidance apparatus which can be readily adjusted to function either as a glide slope projection apparatus for landing aircraft, or as a surface guidance projection apparatus to assist the docking or other positioning of land and marine vehicles.

Accordingly, it is an object of the present invention to provide improved visual guidance apparatus.

It is another object of the present invention to provide visual guidance apparatus which is capable of providing guidance information useful either for airborne vehicles, for surface vehicles, or for pedestrian control.

It is still another object of the present invention to provide visual guidance apparatus which is easily adjustable to provide plural beams of distinguishable illumination arrayed in a plurality of selectable positions.

It is still another object of the present invention to provide visual guidance apparatus which provides longitudinal guidance information which is independent of the line of sight of a vehicle operator relative to the plane of vehicular travel.

Other objects as well as many of the attendent advantages of the present invention will become more readily apparent from the following description of disclosed embodiments thereof, with reference taken to the figures in which.

Stated in general terms, the present invention comprises projection apparatus including an optical system having a multicolor filter to produce corresponding multiple beams of illumination, with at least the optical filter being disposed for selectively variable orientation relative to the axis of beam projection. Appropriate positioning of the filter assembly causes a corresponding change in the direction in which the multiple beams of illumination produced by the multicolor filter are arrayed, without changing the position of each individual beam with respect to the remainder of the beams.

Figure 1:
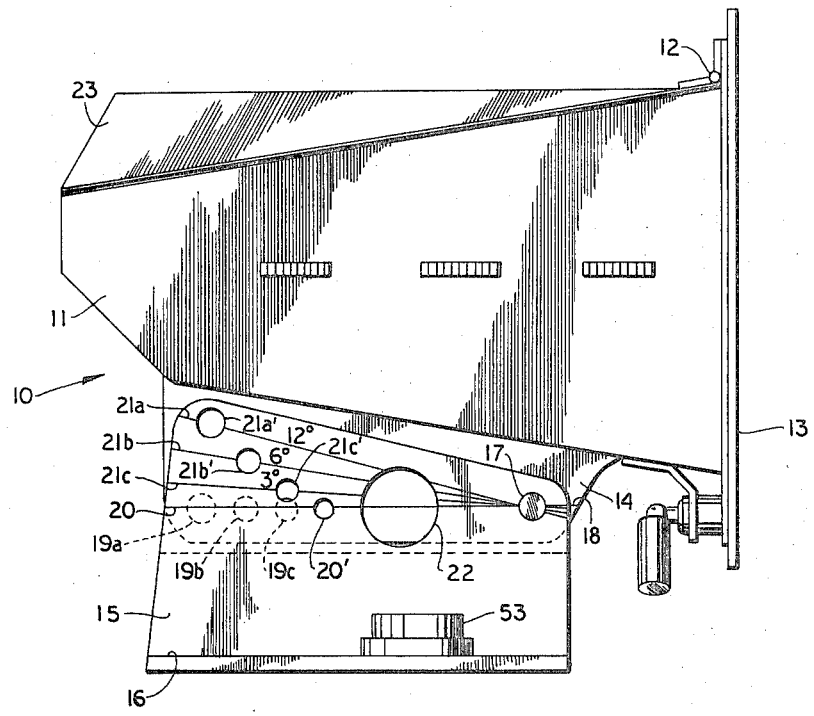
FIG. 1 shows an elevation view of visual guidance apparatus according to a disclosed embodiment of the present invention.
Figure 2:
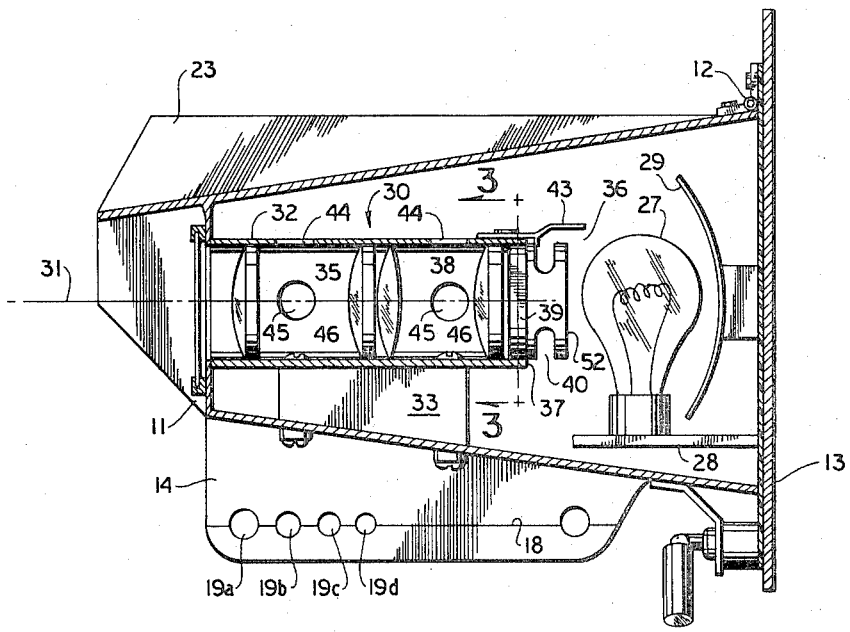
FIG. 2 shows an elevation section view of the housing portion of the apparatus shown in FIG. 1.
Figure 3:
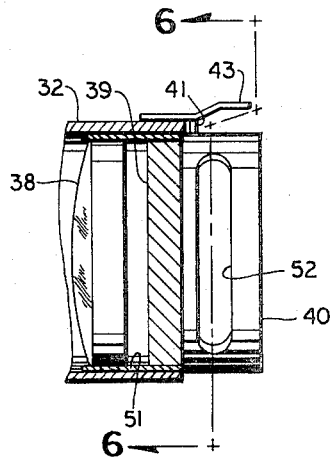
FIG. 3 shows a fragmentary and partially sectioned view of the rotatable filter and heat sink assembly, rotated 90° from the position shown in FIG. 2.
Figure 6:
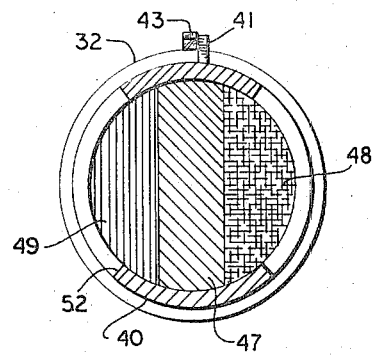
FIG. 6 shows an elevation section view taken along line 6—6 of FIG. 3.

Stated more specifically and with reference to the disclosed embodiment as depicted in FIGS. 1–3, guidance apparatus is shown generally at 10 and including a housing 11 having horizontal sighting fin 23 and pivotally attached along the hinge line 12 to a mounting plate 13. The housing 11 is suitably secured to the fin support 14, which extends downwardly from the housing 11 to be pivotally mounted on the upright member 15 of the base member 16. The upright member 15 shown in FIG. 1 may be one of a pair of bifurcated upright members within which the support fin 14 is received. A bolt or pin 17 extends through corresponding aligned holes in the support fin 14 and in the upright member 15 to support the fin and the associated housing 11 for pivotal movement with respect to the base member. The support fin 14 is provided with a level line 18 and a plurality of adjustment apertures 19a, 19b, 19c, and 19d for a purpose described below, while the base member is provided with a level line 20 and a plurality of angle lines 21a, 21b, 21c, all of such lines being interrupted by the large opening 22. The line 20 and each of the lines 21a, 21c are also individually interrupted by smaller apertures 20' and 21a'-21c', respectively.

Turning to FIG. 2 for a view of the components disposed within the housing 11, there is shown a suitable source of illumination 27 mounted on a bracket 28 secured to the mounting plate 13. The source of illumination 27 can be provided by any suitable device such as an appropriate incandescent lamp or by high-intensity lighting devices such as a quartz-iodine lamp or the like. A reflector 29 is secured to the mounting plate 13 to focus and direct the light output from the source 27, although it will be understood that certain types of projection lamps contain built-in reflective elements which would obviate the need for the separate reflector 29.

Appropriately disposed in front of the illumination source 27 is the optical assembly 30 which focuses and directs the illumination for projection along an axis indicated at 31 and which includes a barrel 32 secured by the member 33 to the housing 11. One or more lenses 35 are received within the barrel 32 to impart the desired optical characteristics to the beam being projected along the axis 31, according to optical techniques known in the art, with a typical lens assembly 35 being selected to project the beam or beams of illumination to be in focus commencing as closely as practicable to the guidance apparatus 10.

A filter assembly 36 is mounted for rotation in the end 37 of the barrel 32. The filter assembly 36 includes a collimating lens 38, a color filter 39, and a heat sink 40. The filter assembly 36 is retained within the barrel 32 by a suitable assembly such as the projection 41 extending through the barrel end 37 into a slot 42 in the filter assembly. The filter assembly 36 in the disclosed embodiment is equipped to be rotatable 90° about the projection axis 31, and any appropriate detent mechanism as at 43 is provided for engagement with suitable index notches corresponding to the desired rotational stop positions disposed at the extremities of the available 90° rotation. It will be understood, however, that the present invention is not limited to a filter assembly disposed for 90° rotation, and that the filter assembly may alternatively be rotatable 180°, for example, with detent index notches appropriately disposed according to the intended applications of the guidance apparatus. Alternatively, the desired rotational adjustment of the filter assembly can be obtained even though the filter assembly 36 is nonrotatably affixed to the barrel 32 of the optical assembly 30. The entire optical assembly 30 is secured to the member 33 with one or more screws 46; correspondingly-positioned sets of holes 44 and 45 extend through the barrel 32 at 90° and 180° rotation thereof, in the disclosed embodiment, and desired rotation of the filter assembly 36 obviously can be changed by rotational repositioning of the barrel 32. It can be seen from the different positions of the heat sink 40 that the filter assembly 39 as depicted in FIG. 3 is rotated 90° from the filter assembly position as depicted in FIG. 2.

The color filter 39 in the disclosed embodiment consists of three optically-distinguishable color segments such as a green center band 47 flanked by a red filter segment 48 and an amber filter segment 49. These or any other desired filter colors are preferably applied to a suitable transparent member mounted within surrounding retaining rim 51 of the heat sink 40. It will be understood that the presence of the cutaway portion 52 of the heat sink 40, which is preferably comprised of a suitable thermally conductive material such as aluminum or the like and is preferably appropriately shaped to enhance radiation of absorbed heat, absorbs a portion of the heat developed by the illumination source 27 and thus protects the filter segments from exposure and possible deterioration resulting from excessive heating.

It will be understood from the disclosed embodiment as described thus far that the guidance apparatus 10, with the rotatable filter assembly 36 positioned as shown in FIG. 3, functions to project a composite beam of illumination which consists of three separate yet contiguous colored beam segments corresponding to the colors of the three filter segments 47, 48, and 49, with these three beam segments disposed in horizontal array, that is, a person moving in the appropriate direction on a horizontal plane intersecting the projected composite beam will sequentially perceive an amber beam segment, a green beam segment, and then a red beam segment. The sequence in which these three beam segments are perceived can be readily reversed, however, simply by rotating the filter assembly 36 by 180° about the axis 31, so that a person travelling in the same direction along the aforementioned horizontal plane now perceives a red-green-amber sequence of beam segments. It will be appreciated that this feature of the present invention, permitting rapid and simple reversal of the sequence in which the beam segments are projected without requiring precision tools or necessitating realignment of the projection apparatus, especially adapts the guidance apparatus of the present invention for installation and use in a number of surface guidance applications where a single model of guidance apparatus can be manufactured without regard to the specific left-right filter segment orientation which may be required in a particular installation of that apparatus. The annular ring surrounding the cutaway portion 52 may be provided with suitable indicia, preferably both color-coded and raised or embossed legends identifying the specific colors, denoting the nature of the beam projected with each possible orientation of the filter assembly.

When the filter assembly 36 is rotated to place the three filter segments in a vertical array, that is, an array rotated 90° from the orientation as shown in FIG. 3, it will be understood that a corresponding vertical array of beam segments is projected having a red segment, a green segment, and an amber segment in vertically ascending order. This vertical array of projected beam segments, when projected at an appropriate angle of inclination relative to a horizontal plane, affords a visual indication of glide path suitable for flying an aircraft to a point where flare-out and landing can be accomplished.

The angle of inclination for glide path applications is readily obtained by use of the apparatus shown in FIG. 1. The base member 16, which is preferably equipped with a suitable leveling device such as a conventional circular bubble level 53, is initially installed to be level at the desired location adjacent an aircraft runway. The support fin 14 is then adjusted relative to the upright member 15 until the level line 18 on the fin, as viewed through the large opening 22 in the upright member 15 appears to provide an extension of the selected one of the lines 21a–21c corresponding to the desired glide path angle. Assuming that a glide path angle of 6° is selected, for example, the level line 18 is aligned with the 6° angle line 21b to place the aperture 21b' in alignment with the adjustment aperture 19b in the fin 14. A bolt or other fastener may be extended through the aligned apertures 21b' and 19b to retain the selected angle of inclination. A line of sight can be taken along the fin 23 to determine whether the projected beam provides the necessary clearance over obstructions such as trees or the like.

Figure 4:
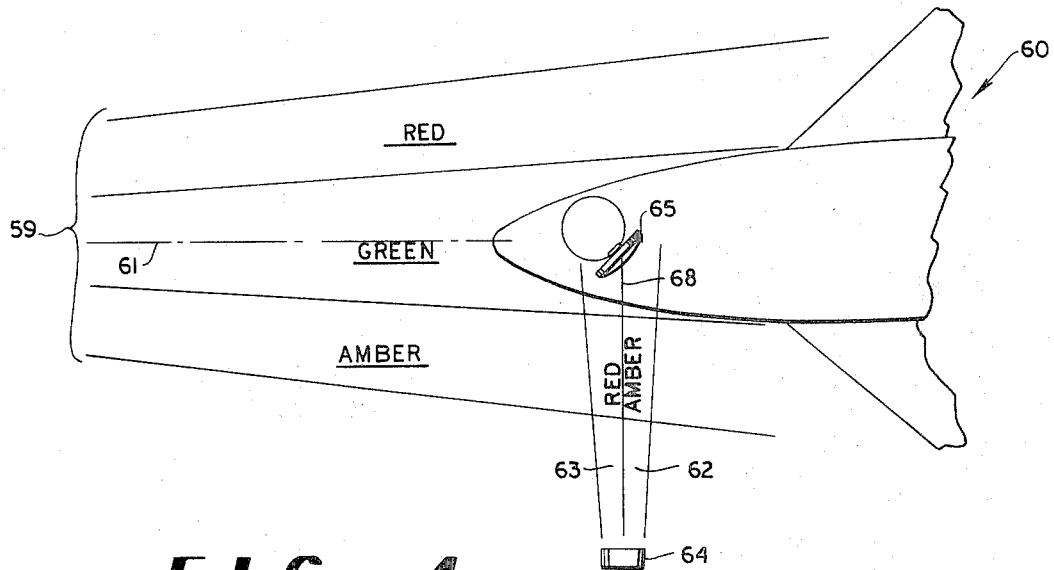
FIG. 4 shows a plan view illustrating an embodiment of the present invention used to provide longitudinal or "stopping point" guidance information.
Figure 5:
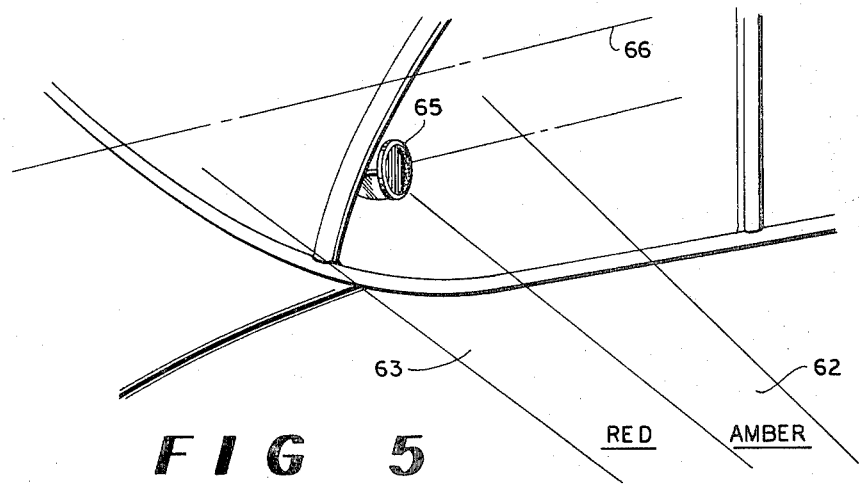
FIG. 5 shows a fragmentary isometric view of a vehicle operating station equipped to utilize the embodiment disclosed in FIG. 4.

Turning to FIGS. 4 and 5, there is shown another embodiment of the present invention which operates to define a longitudinal plane which may impart "stop," "turn," or other information to the operator of a vehicle. In the depicted embodiment, an aircraft 60 is shown taxiing along a path defined by a horizontal array 59 of colored beam segments produced by apparatus as described above. The nominal path of travel 61 is intercepted by a secondary beam of illumination consisting of a flashing amber beam segment 62 and a flashing red beam segment 63, both beam segments being projected by the projection apparatus 64. It will be understood that the apparatus 64 may be identical to the embodiment of the guidance apparatus depicted in FIGS. 1–3, with the exception that the color filter 39 has been replaced by a substitute color filter which produces the contiguous amber and red beam segments, such other color filter being provided, for example, by a filter having semi-circular amber and red segments. The flashing effect is obtained by any suitable technique, such as by periodically interrupting the power supplied to the illumination source 27 or by providing an appropriate mechanical shutter arrangement which alternately interrupts and passes the light beam omitted by the apparatus 64.

The aircraft 60 is provided with a reflective device 65, shown in the disclosed embodiment to be a mirror having a slightly convex surface. An exemplary aircraft cockpit is depicted in FIG. 5 with the line 66 indicating a nominal line of sight for pilots who vary in height and who also vary in selected elevation of the pilot's seat. It can be seen that the reflective mirror 65 is positioned with the centroid of the mirror substantially beneath the sight line 66 in a vertical plane therewith; the mirror may be hinged or otherwise movably connected to the panel of the aircraft cockpit to be stowed in a folded or flat position when not actually in use.

Considering the operation of the embodiment depicted in FIGS. 4 and 5, it is first assumed that the pilot of the taxiing aircraft 60 has moved the mirror 65 to the erect position as shown in FIG. 5 and is about to taxi the airrcraft into a position where the reflective device first enters the flashing amber beam segment 62. When this occurs, the flashing amber illumination is reflected by the mirror 65 toward the pilot, immediately informing him that he is imminently approaching a location where some act (such as stopping the aircraft or turning the aircraft onto a different taxiway) is required. The mirror 65 is preferably positioned below the actual line of sight of the pilot, provided that the centroid of the mirror is in a vertical plane occupied by the nominal line of sight 66, enabling the pilot to receive this cautionary information without the need for any apparatus which is positioned to block his view of the aircraft path of travel.

Continued movement of the aircraft moves the mirror 65 through the amber beam segment 62 and into the red beam segment 63, at which time the flashing red illumination is reflected toward the pilot. He is thus immediately informed that he must stop the aircraft or perform some other predetermined maneuver. Since the amber beam segment 62 and the red beam segment 63 are contiguous along a vertical plane of intersection 68, it can be seen that the transition from flashingamber to flashing-red, as reflected toward the pilot, occurs as soon as the mirror 65 enters the plane 68. In this way, the flashing-red signal is presented irrespective of any variations of the pilot's actual line of sight occurring along a vertical plane occupied by the sight line 66 and resulting from variables such as pilot height, seat adjustment, variations in cockpit elevation above the runway occurring in different types of aircraft, or other factors. Although the transition along the plane 68 from the amber beam segment to the red beam segment is substantially immediate, the spherical surface provided by the slightly convex mirror surface mentioned above provides an enhanced "flipping" effect so that the pilot perceives an immediate and unmistakable transition from amber to red as the mirror 65 enters the plane 68.

Although the embodiment of FIGS. 4 and 5 has been described with reference to ground navigation of an aircraft, it will be understood that the navigation or surface movement of marine vessels and other vehicles can be assisted by similar combinations of apparatus. For example, a similar arrangement can signal the turning point required for the proper navigation of intersecting ship channels. Furthermore, although the plane 68 of the secondary beam is shown intersecting the vehicle path 61 at substantially a right angle, it will be understood that this is not essential to the operation and that angles of intersection other than right angles may be employed. If an angle of intersection other than 90° is employed, however, it will also be understood that a verhicle such as the aircraft 60 which is moving along an actual path offset from the intended path 61 will cause the mirror 65 to enter the plane 68 at a location which varies longitudinally to an extent depending upon the amount of such offset from the path 61.

Experiments in marine vehicle guidance performed with three-color beam projection apparatus of the type depicted in FIGS. 1–3 has demonstrated that the intersection of two ship channels, each defined by a separate three-color beam, is readily perceived as the ship's operator moves into intersection with the approached channel beam. Accordingly, a secondary beam as disclosed in FIGS. 4 and 5 may be unnecessary in such application.

The automotive vehicle and pedestrian control applications of the present inventions are based on the use of the same collimating lens and filter system described under the application for maneuvering aircraft. In the vehicle and pedestrian control applications, however, it may be desirable to use either a single or a multicolored filter. This would be dependent upon the specific indications required at a given intersection or location. Also, the width of the viewed light beam or any portion thereof will be determined by the type and design of the filters used in each case.

The system can be used wherever it is advantageous, from the standpoint of motorist or pedestrian safety, to limit or restrict the viewing angle of the signal or to show an indication of one color to one segment of traffic and indications of different color to other segments of traffic.

Two or more separate visual guidance apparatuses according to the present invention can be contained within a single overall outer housing if it is desired to project identical beams for redundancy or to project dissimilar beams emanating from a common point of origin.

It will also be understood that the foregoing relates only to preferred embodiments of the present invention, and that numerous alterations and modifications may be made therein without departing from the spirit and the scope of the invention as set forth in the following claims.

What is claimed is:

1. Apparatus for projecting a beam of illumination containing guidance information, comprising:
    a housing means;
    an optical system at least partially disposed within said housing means for directing a beam of illumination along an optical path, said system including a source of illumination, filter means disposed in said optical path to divide said beam of illumination into at least two optically distinguishable beam segments, means to project said beam of said illumination along said optical path; and
    means adjustably mounting said filter means for selective rotational movement between at least two predetermined positions of said filter means with respect to said beam to selectively rotate the orientation of said beam segments with respect to a certain reference datum of said optical path.

2. Apparatus as in claim 1, wherein said filter means is mounted for selective rotational movement on an axis coincident with the axis along which said beam of illumination is projected.

3. Apparatus as in claim 2, comprising stop means cooperatively disposed with said filter means to limit the extent of said rotational movement of said filter means to rotation between said predetermined positions.

4. Apparatus as in claim 3, wherein said rotatable filter means comprises a plurality of optically distinguishable filter segments serially disposed across said filter means in a direction substantially normal to said optical path to provide a rotatable filter segment array producing said beam segments which are selectively rotatable with respect to the axis along which said beam is projected.

5. Apparatus as in claim 1, wherein said movably mounted filter means comprises a plurality of optically distinct filter segments serially disposed across said filter means to provide a filter segment array which is assymetrical with respect to the axis of the beam.

6. Apparatus as in claim 5, wherein:
    said optical system includes a barrel member having an internal passage aligned with the beam axis to permit said beam of illumination to pass therethrough;
    said filter means being attached to said barrel means;
    a support member connected with said housing means in position to retain said barrel member in predetermined position; and
    at least two connection means disposed on said barrel member for enabling said retention on said support member;
    one of said connection means being disposed at a radial position relative to the beam axis which is dissimilar to such relative radial position of the other said connection means.

7. Apparatus as in claim 1, further comprising:
    mounting support means selectively pivotally interconnected with said housing means so that the optical path of the projected beam of illumination is selectively angularly adjustable relative to said mounting support means;
    first index member mounted with said support means;
    second index member mounted with said housing means in position defining an angular indicating relation with said first index member which varies in correspondence with said adjustment of the beam of illumination relative to said support means;
    one of said index members having an indicium disposed thereon in alignment with said pivotal interconnection and parallel to said optical path;
    the other of said index members having a plurality of indicia disposed thereon in diverging relation from said pivotal interconnection, said plurality of indicia corresponding to selected predetermined angular relationships of the beam of illumination relative to said support means; and
    said other index member having an aperture formed therein in position to interrupt each of said plural indicia and to expose to view said indicium of said one index member to permit selective alignment of said one index member as a continuation of any of said interrupted indicia in response to movement about said pivotal interconnection.

8. Apparatus as in claim 7, wherein:
    each of said plurality of indicia on said other index member has an aperture interrupting the corresponding indicium and extending into said other index member;
    each said aperture interrupting said plurality of indicia having certain and unique spacing apart from said pivotal interconnection; and
    said indicium on said one index member being interrupted by a plurality of apertures corresponding to said firstmentioned plurality of apertures in number and in said certain and unique spacing apart from said pivotal interconnection, so that the selective alignment of said indicium of said one index member with any of said other indicia causes and is indicated by alignment of one said aperture interrupting said other indicia with the correspondingly-spaced one of said apertures interrupting said indicium of said one index member.

9. System providing guidance information for the operator of a vehicle, comprising:

first means disposed to direct a first beam of illumination containing information indicating a nominal path of travel for a vehicle;

said first beam of illumination presenting a first color at locations along said nominal path of travel and presenting at least one other color optically distinguishable from said first color at locations which are laterally displaced at least a certain distance from said nominal path of travel;

second means disposed at a location laterally spaced from said nominal path of travel to direct a second beam of illumination having a color pattern optically distinguishable from said first beam of illumination in a direction to intersect said first beam of illumination at substantialy a right angle therewith; and reflective means mounted on a vehicle intended for travel along said nominal path, said reflective means positioned on said vehicle at a predetermined angle relative to the longitudinal axis of said vehicle to intercept said second beam of illumination and to direct said intercepted second beam of illumination toward the location occupied by an operator of the vehicle while leaving said first beam of illumination substantially unaffected.

10. Apparatus as in claim 9, wherein said second means is operative to provide said second beam of illumination presenting a substantially vertical plane of entry to a vehicle approaching said second beam along the nominal path of travel.

11. Apparatus as in claim 10 wherein said second means is operative to direct said second beam of illumination comprising a cautionary beam portion and an instructional beam portion to intersect said nominal path of travel, said cautionary and instructional beam portions being optically distinguishable from each other and being contiguous one to the other along and comprising said substantially vertical plane of entry.

12. Apparatus as in claim 10, wherein:

said reflective means is mounted in said vehicle to occupy a position which is in a vertical plane nominally occupied by the line of sight of the vehicle operator; and said reflective means is positioned on said vertical plane at a position which does not substantially obscure said first beam of illumination.

13. System as in claim 9, wherein one of said first and second illumination means provides an illumination beam having a flashing operating mode, and the other of said illumination means provides an illumination beam having an operating mode visually distinguishable from the first illumination beam.

* * * * *